(12) United States Patent
Saha et al.

(10) Patent No.: US 8,725,456 B1
(45) Date of Patent: May 13, 2014

(54) DECOMPOSITION TECHNIQUE FOR REMAINING USEFUL LIFE PREDICTION

(75) Inventors: Bhaskar Saha, San Jose, CA (US); Kai F. Goebel, Mountain View, CA (US); Abhinav Saxena, Mountain View, CA (US); Jose R. Celaya, Sunnyvale, CA (US)

(73) Assignee: The United States of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 562 days.

(21) Appl. No.: 12/454,024

(22) Filed: May 5, 2009

(51) Int. Cl.
*G06F 17/18* (2006.01)
*G06F 19/00* (2011.01)

(52) U.S. Cl.
USPC .............. 702/181; 702/34; 702/35; 702/182; 702/183

(58) Field of Classification Search
USPC ..................................... 702/34, 35, 181–183
See application file for complete search history.

(56) References Cited

U.S. PATENT DOCUMENTS

| | | | |
|---|---|---|---|
| 6,490,698 B1 * | 12/2002 | Horvitz et al. ................... | 714/46 |
| 7,149,657 B2 | 12/2006 | Goebel et al. | |
| 7,328,128 B2 * | 2/2008 | Bonanni et al. ............... | 702/182 |
| 7,395,188 B1 | 7/2008 | Goebel et al. | |
| 7,548,830 B2 | 6/2009 | Goebel et al. | |
| 7,725,293 B2 | 5/2010 | Bonissone et al. | |
| 8,015,126 B2 * | 9/2011 | Chidlovskii et al. ............ | 706/12 |
| 2006/0259217 A1 * | 11/2006 | Gorinevsky et al. ............ | 701/29 |
| 2006/0265146 A1 * | 11/2006 | Gorinevsky et al. ............ | 702/39 |
| 2007/0198215 A1 * | 8/2007 | Bonanni et al. ............... | 702/183 |
| 2009/0192729 A1 * | 7/2009 | Pado et al. ....................... | 702/36 |
| 2010/0070435 A1 * | 3/2010 | Candela et al. ................. | 706/12 |
| 2010/0082267 A1 * | 4/2010 | Schimert et al. ............... | 702/34 |

OTHER PUBLICATIONS

Michael J. Romer et al., "An Overview of Selected Prognostic Technologies with Application to Engine Health Management", Proceedings of GT 2006, ASME Turbo Expo 2006, May 8-11, 2006, Barcelona, Spain.*

Bhangu, et al., Nonlinear Observers for Predicting State-of-Charge and State-of-Health of Lead-Acid Batteries for Hybrid-Electric Vehicles, IEEE Transactions on Vehicular Technology, May 2005, 783-794, vol. 54, No. 3.

(Continued)

*Primary Examiner* — John Breene
*Assistant Examiner* — Alexander Satanovsky
(74) *Attorney, Agent, or Firm* — John F. Schipper; Christopher J. Menke; Robert M. Padilla

(57) ABSTRACT

The prognostic tool disclosed here decomposes the problem of estimating the remaining useful life (RUL) of a component or sub-system into two separate regression problems: the feature-to-damage mapping and the operational conditions-to-damage-rate mapping. These maps are initially generated in off-line mode. One or more regression algorithms are used to generate each of these maps from measurements (and features derived from these), operational conditions, and ground truth information. This decomposition technique allows for the explicit quantification and management of different sources of uncertainty present in the process. Next, the maps are used in an on-line mode where run-time data (sensor measurements and operational conditions) are used in conjunction with the maps generated in off-line mode to estimate both current damage state as well as future damage accumulation. Remaining life is computed by subtracting the instance when the extrapolated damage reaches the failure threshold from the instance when the prediction is made.

22 Claims, 2 Drawing Sheets

(56) References Cited

OTHER PUBLICATIONS

Bock, et al., Ontogenetic Reasoning System for Autonomic Logistics, Proceedings of the IEEE Aerospace Conference, 2005, New York: IEEE.

Bonissone, et al., When will it break? A Hybrid Soft Computing Model to Predict Time-to-break Margins in Paper Machines, Proceedings of SPIE 47th Annual Meeting, International Symposium on Optical Science and Technology, 2002, 53-64, vol. 4787.

Brown, et al., Electronic Prognostics—A Case Study Using Switched-Mode Power Supplies (SMPS), Proceedings of the IEEE Systems Readiness Technology Conference, 2006, New York: IEEE.

Byington, et al., Data-Driven Neural Network Methodology to Remaining Life Predictions for Aircraft Actuator Components, Proceedings of the IEEE Aerospace Conference, 2004, New York: IEEE.

Chinnam, et al., A Neuro-Fuzzy Approach for Estimating Mean Residual Life in Condition-Based Maintenance Systems, International Journal of Materials and Product Technology, 2004, 166-179, vol. 20.

Frelicot, A Fuzzy-Based Prognostic Adaptive System, RAIRO-APII-JESA, Journal Europeen des Systemes Automatises, 1996, .281-99, vol. 30, No. 2-3.

Goebel, et al., Fusing Competing Prediction Algorithms for Prognostics, Proceedings of 2006 IEEE Aerospace Conference, 2006, New York: IEEE.

Goebel, et al., Prognostic Fusion for Uncertainty Reduction, Proceedings of AIAA@Infotech Aerospace Conference, Reston, Feb. 2007, VA: American Institute for Aeronautics and Astronautics, Inc.

Khawaja, et al., Reasoning about Uncertainty in Prognosis: A Confidence Prediction Neural Network Approach, Proceedings of the Annual Meeting of the North American Fuzzy Information Processing Society, 2005.

Orchard, et al., A Particle Filtering Framework for Failure Prognosis, Proceedings of the World Tribology Congress, Sep. 12-16, 2005.

Roemer, et al., Autonomous Impact Damage Detection and Isolation Prediction for Aerospace Structures, Proceedings of the IEEE Aerospace Conference, 2005, New York: IEEE.

Roemer, et al., Prognostics and Health Management Software for Gas Turbine Engine Bearings, Proceedings of the ASME Turbo Expo, 2007, New York: ASME.

Saha, et al., An Integrated Approach to Battery Health Monitoring using Bayesian Regression, Classification and State Estimation, Proceedings of IEEE Autotestcon, 2007, New York: IEEE.

Schwabacher, et al., A Survey of Artificial Intelligence for Prognostics, Working Notes of 2007 AAAI Fall Symposium: AI for Prognostics, 2007.

Shao, et al., Prognosis of Remaining Bearing Life Using Neural Networks, Proceedings of the Institute of Mechanical Engineer, Part I, Journal of Systems and Control Engineering, 2000, vol. 214, No. 3.

Sheldon, et al., Detection of Incipient Bearing Faults in a Gas Turbine Engine Using Integrated Signal Processing Techniques, Proceedings of the American Helicopter Society Annual Forum, 2007, Alexandria, VA: AHS.

Stone, et al., Neural Net Based Prognostics for an Industrial Semiconductor Fabrication System, Proceedings of the IEEE International Conference on Systems, Man and Cybernetics, 2005, New York: IEEE.

Volponi, Data Fusion for Enhanced Aircraft Engine Prognostics and Health Management, NASA Contractor Report CR-2005-214055, Dec. 2005.

Xue, et al., An Instance-Based Method for Remaining Useful Life Estimation for Aircraft Engines, Proceedings of MFPT, 2007.

* cited by examiner

DECOMPOSITION TECHNIQUE FOR REMAINING USEFUL LIFE PREDICTION

ORIGIN OF THE INVENTION

The invention described herein was made in the performance of work under a N.A.S,A. contract and by an employee of the United States Government and is subject to the provisions of Public Law 96-517 (35 U.S.C. §202) and may be manufactured and used by or for the Government for governmental purposes without the payment of any royalties thereon.

FIELD OF THE INVENTION

This invention relates to prediction of remaining useful life for an active system or object.

BACKGROUND OF THE INVENTION

The estimation of remaining useful life ("RUL") of a faulty component is at the center of system prognostics and health management. RUL analysis provides operators with a potent tool for decision making, by quantifying how much time is left until functionality of the component is lost. This is especially important for systems, where unanticipated sub-system or component failure may lead to failure of the system, as a whole, which in turn may adversely affect safety of operations and/or may have costly consequences, resulting from emergency procedures implemented, delayed operations, unanticipated maintenance and repair, unserved or unmet obligations, and penalties. In situations where the cost/benefit analysis of using physics-based damage progression algorithms is not favorable but sufficient test data are available to comprehensively describe the damage space, one can employ data-driven approaches, or a combination of data-driven approaches and model-based (hybrid) techniques. Conventional data driven approaches attempt to either learn RUL directly from sensor measurements and features or by correlating trends in measurements or features to remaining life. These methods are frequently susceptible to artifacts in training data, as well as unanticipated future operating conditions.

Common to data-driven approaches is the modeling of desired system output (but not necessarily of the mechanics of the system) using historical data. Such approaches encompass "conventional" numerical algorithms, like linear regression or Kalman filters, as well as algorithms that are commonly found in the machine learning and data mining communities. The latter algorithms include neural networks, decision trees, and Support Vector Machines.

One of the most popular data-driven approaches in prognostics is artificial neural networks ("NNs"). An artificial neural network is a type of (typically nonlinear) model that establishes a set of interconnected functional relationships between input stimuli and desired output where the parameters of the functional relationship need to be adjusted for optimal performance. In addition to supervised networks, other types, such as reinforcement learning, have been proposed. Some of the conventional numerical techniques used for data-driven prognostics include wavelets, Kalman filters, particle filters, regression, demodulation and statistical methods. Another popular technique that is used for prognostics is fuzzy logic. Fuzzy logic provides a language (with syntax and local semantics) into which one can translate qualitative knowledge about the problem to be solved. The fuzzy reasoning mechanism has powerful interpolation properties that in turn give fuzzy logic a remarkable robustness with respect to variations in the system's parameters, disturbances, etc.

Evaluating RUL by correlating data with remaining life is a difficult problem because of the difficulty in recognizing relevant changes over both long term and short term horizons, so that the prediction is made with high accuracy and precision. Minimizing performance error is hard, because errors tend to be multiplicative, rather than additive.

Another core issue encountered in making a meaningful prediction is to account for and to subsequently bound the various kinds of uncertainties arising from different sources, such as process noise, measurement noise, inaccurate process models, etc. Long-term prediction of the time to failure involves large-grain uncertainties that must be represented effectively and managed efficiently. For example, as more information about past damage propagation and about future use becomes available, the uncertainty bounds should become narrowed. Therefore, it is critical to choose methods that can take care of these issues in addition to providing damage trajectories.

What is needed is a method that makes the prediction problem tractable, reduces performance error, and allows judicious management of the effects of uncertainty mentioned above.

SUMMARY OF THE INVENTION

These needs are met by the invention, which provides a method having a training (off-line) mode and a subsequent run-time (on-line) mode for estimating a remaining useful life ("RUL") of an object that is in active use for at least part of the time (an "active object"). In the training mode, the system collects training data, including operating conditions of the object, measurements from sensors monitoring the system, and the ground truth indicating the true extent of damage. The system extracts or identifies precursors of failure from the sensor data by analyzing their correlation to the ground truth. The feature domain size is optionally reduced by eliminating one or more features that are highly correlated to other features, such that their exclusion does not diminish information about damage progression in the system.

A feature-to-damage mapping or association is created, and a mapping or association of operating conditions to damage growth rate is created. Uncertainties in sensor measurement, feature extraction, and in feature(s)-to-damage mapping are identified and quantified, in order to manage them. Uncertainties and their effects upon the associated damage estimates are estimated, and variation of damage is estimated. Uncertainties in future operating conditions, to the extent that future operating conditions are not determined by the preceding operating conditions, are estimated. Kernels are used to transfer data (or data characteristics) into a meta-domain for both the feature(s)-to-damage and the conditions-to-damage-growth-rate mappings. The kernels may be probabilistic, fuzzy logic, deterministic, etc. The mappings or associations may be implemented using a Relevance Vector Machine ("RVM") approach, a Gaussian Process regression ("GPR") approach, a Particle Filtering ("PF") approach, a Neural Network ("NN") approach and/or any other suitable approach. The feature-to-damage maps and the conditions-to-damage-growth-rate maps may be updated at any time to reflect additional insights into damage progression, for example when more ground truth data becomes available, even during run-time, for either the same fault modes that are covered by the map or for other fault modes or conditions affecting damage growth.

In the run-time mode, which is executed after at least an initial map has been generated, the system collects run-time data, including present operating conditions of the object, sensor measurements, and other relevant parameters. The system then extracts or identifies precursors of failure and the associated features. Optionally each feature extracted is associated with an uncertainty in sensor measurement and in feature extraction. Optionally, clean-up processes are applied to reduce the size of the feature set:

At a time when it is desired to predict RUL, uncertainties in sensor measurements (present and future) are estimated, the feature(s)-to-damage mapping or association created in the training mode is used, and a present damage state is estimated. Uncertainties in future damage estimates are estimated and in future operating conditions are estimated. The mapping of operating conditions to damage growth rates created in the training mode is used. Future damage accumulation is estimated. The estimated damage growth is extrapolated to a user-provided failure threshold. In order to do this, estimated future damage accumulation is added to (estimated) present damage over a corresponding time interval to arrive at an updated present damage. This process is terminated when the failure threshold is reached or exceeded. An estimated RUL for the object is computed, measured from the time instant corresponding to the current damage estimate. The RUL prediction routine may be repeated as often as desired in the run-time mode.

DESCRIPTION OF BEST MODES OF THE INVENTION

Figure 1:
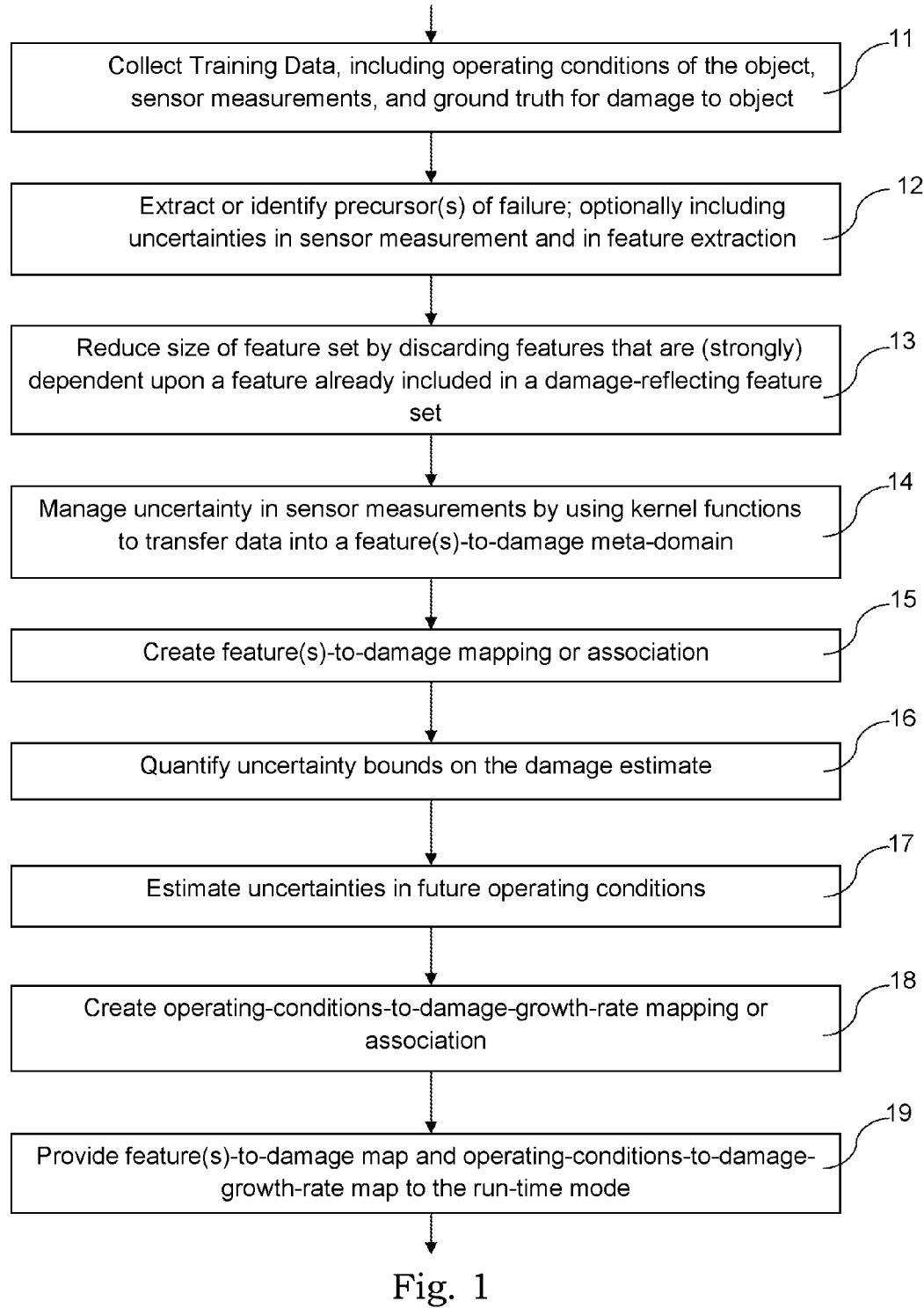
FIGS. 1 and 2 are flow charts of steps in the training mode and in the run-time mode, respectively, in an embodiment for practicing the invention.

The decomposition technique for remaining useful life ("RUL") prediction has two modes of operation, an off-line training mode and a run-time usage mode. The starting point of the training mode procedure, illustrated in FIG. 1, is a data collection module that collects the sensor measurements, the operational conditions and the ground truth, which is indicative of the extent of damage to the object or system of interest. Sensor measurements are typically of the form of temperature, pressure, vibration, voltage, current etc. Operational conditions include, but are not limited to, ambient temperature, humidity, load force or torque, rotational speed, impedance load, percentage-of-use, etc. The definition of "ground truth" varies according to the application domain. For example, the ground truth for bearing wear could be spall length; for a gearbox it could be crack size; or it could be more indirectly derived values like the internal impedance of a battery obtained from electrochemical impedance spectroscopy (EIS). The key property of ground truth values is that these values are typically rarely collected during run-time, and thus cannot be effectively used to learn the aging characteristics of a system. The ground truth values serve primarily as verification points for the learning algorithms described later.

The next step is to perform feature extraction on the collected sensor data as represented by the feature extraction module. Features or condition indicators ("CIs") are information extracted from the raw sensor values that have an observable or significant correlation with the damage dimension of interest. For example, the spall length (damage dimension) of a bearing in active use cannot be measured directly without taking the bearing system apart. However, accelerometer data, collected from the bearing housing, can be analyzed in the frequency domain to determine the energy content in the signal in a narrow frequency band around the expected bearing race defect frequency. The ratio of this energy content (by itself, or as a percentage of total signal energy) to the baseline signal in the absence of the defect can be treated as a feature of the spalling process.

The features extracted are application-dependent and are derived from features presented in the literature. However, additional sources of uncertainty are analyzed in the feature extraction process, for example, de-noising, filtering, windowing etc., and represent the uncertainties explicitly as random variables or processes. Subsequent to this, a reduction of the feature domain size is performed. A first step for this method is to investigate pair-wise correlation of features between the time series data of all the extracted features. Using a correlation threshold, the strongly-correlated or dependent features in the set are discarded so as to prevent duplication of information. The choice of this threshold determines the tradeoff between reduction in problem dimension and the loss of information in the features discarded.

After the training dataset is pre-processed, the damage progression learning task is divided into two independent parts: (1) present damage estimation and (2) future damage estimation. This separation of tasks makes the errors in these processes additive instead of multiplicative as in the traditional approach of expressing the damage as a function of all features and conditions. The first sub-component of the present damage estimation method is sensor uncertainty management, relying on kernel function transformation to transform the training data into a feature-to-damage meta-domain. The kernel function can be of various types, such as probabilistic (e.g. Gaussian), fuzzy logic, deterministic, etc. The meta-domain into which data are transformed depends on the transformation algorithm and on the kernel function(s) chosen. The primary advantage of abstracting the system data in this form is to eliminate learning biases caused by the sparseness of datasets and over-fitting to the training data.

The next step is to create a feature-to-damage map from the extracted features and the damage recorded in the ground truth data. This task may be performed using various algorithms. Here, probabilistic algorithms such as Relevance Vector Machines ("RVM"), Gaussian Process Regression ("GPR"), and/or Particle Filtering ("PF") are used. However, other learning algorithms, like Neural Networks ("NN"), can also be used. RVM is a Bayesian formulation of a generalized linear model of identical functional form to the Support Vector Machine (SVM). Although, SVM is a state-of-the-art technique for classification and regression, it suffers from a number of disadvantages, one of which is the lack of probabilistic outputs that make more sense in health monitoring applications. RVM attempts to address these very issues in a Bayesian framework. Besides the probabilistic interpretation of its output, it uses a lot fewer kernel functions for comparable generalization performance. Operations for RVM include identifying the relevance vectors in the transformed feature-damage hyperplane, which is the representation of the meta-domain in this case. Learning iterations are performed on the training data to minimize the set of relevance vectors and to derive their relative weights. This set of vectors and weights represents the mapping between features and damage.

GPR is a collection of random variables any finite number of which has a joint Gaussian distribution. A real GP is completely specified by its mean and co-variance functions. Given prior information about the GP and a set of training points, the posterior distribution over functions is derived by imposing a restriction on prior joint distribution to contain only those functions that agree with the observed data points. For GPR, a form of the feature-damage co-variance function matrix is selected, based on analysis of the application domain and on the physics-of-failure involved. The parameters of this covariance function matrix are iteratively derived from the training data, which provides the desired mapping.

Bayesian techniques also provide a general rigorous framework for dynamic state estimation problems. The core idea is to construct a probability density function ("pdf") of the state based on all available information. For the PF approach the pdf is approximated by a set of particles (points) representing sampled values from the unknown state space, and a set of associated weights denoting discrete probability masses. The particles are generated and recursively updated from a nonlinear process model that describes the evolution in time of the system under analysis, a measurement model, a set of available measurements, and an a priori estimate of the state pdf. In other words, PF is a technique for implementing a recursive Bayesian filter using Monte Carlo ("MC") simulations, and as such is known as a sequential MC ("SMC") method. The PF method can be used to learn a data-derived functional relationship (system model) between features and damage. The process involves choosing a suitable form of the model and incorporating the model parameters along with the extent of damage as the state variables to be tracked. The PF then iteratively learns from the training data and fine tunes the model, which can then be used for run-time damage estimation. A Neural Network approach or other data-driven approaches can also be used to learn the feature-to-damage mapping.

We next focus on the learning process that estimates future damage. The first step in this process manages the uncertainty about the damage estimate. Here we quantify the variation of the damage estimate as a pdf. This variation may be a direct output of the damage estimation performed by the feature-damage mapping. Alternatively, application-dependent analysis of initial damage variation can be used, or random variation around the damage estimate can be used, with Bayesian updates to manage the uncertainty. We also represent the uncertainty about expected future operational conditions and estimate user-defined uncertainty bounds around expected future usage or a set of alternate operational scenarios to express uncertainty. One can correlate variation in past usage with expected uncertainty of future usage depending on information available. The conditions-to-damage-rate mapping process is functionally similar to the corresponding process in the training mode, but here one correlates the operational conditions to the damage growth rate derived from training data. Subsequent run-time process steps are functionally similar to the corresponding training mode steps, with the features replaced by operational conditions and extent of damage replaced by damage growth rate. The feature(s)-to-damage map and the conditions-to-damage-growth-rate map comprise the principal outputs of the off-line training process and can be updated anytime, even in the run-time mode, when additional ground truth data, for the fault modes covered in the maps or for other fault modes, become available.

The mappings learned in the preceding off-line training mode are subsequently used in the run-time usage mode, illustrated in FIG. 2. The starting point is data collection, which captures the run-time sensor measurements and operational conditions, among other data. It is assumed here that ground truth data are generally not available at run-time. The feature extraction, the sensor uncertainty management, the damage estimate uncertainty management, and the future operational conditions uncertainty management are functionally the same as for the training mode, but operate on run-time data in this case. For the present damage estimation subtask, the damage features are derived with some uncertainty bounds around them, which are then input to the damage mapping. The damage map provides estimated present damage values with associated uncertainty bounds.

The current damage estimation uses this output to estimate the current damage value as a pdf. Similarly, for the future damage estimation subtask, uncertainty estimates for current damage and future operating conditions are input to the damage-growth-rate mapping (that uses the damage-growth-rate map created in the off-line mode) to derive the damage growth rate with uncertainty bounds as output. Next, future damage accumulation is estimated by integrating the damage growth rate pdf over suitable iteration units, which may be the duration of discrete time steps or usage cycles etc.

The estimated pdfs of the present damage estimate and damage accumulation are combined at each of the future iteration-points to extrapolate damage growth. Future damage accumulation is added to the present damage estimate and this sum is iterated over units of interest (time, cycles etc.). The process is terminated when an application-specific failure criterion is reached or exceeded. The RUL is computed by subtracting the iteration units of interest at the instant of prediction from the iteration units of interest when the predicted damage reaches the failure criterion (failure time minus current run time). The RUL prediction routine may be repeated as often as desired in the run-time mode. It is important to note that the RUL generated is not a single value like the traditional concepts of Mean-Time-between-Failures (MTBF), rather it is a pdf that provides a truer representation of the uncertainties inherent in system prognostics.

FIG. 1 is a flow chart of procedural steps used to practice the training (off-line) mode of the invention. In step 11, the system collects data for training, including operating conditions of the object, sensor measurements, and ground truth. In step 12, the system extracts or identifies precursors of failure. Optionally each feature extracted is associated with an uncertainty in sensor measurement and in feature extraction. Optionally, clean-up processes such as de-noising, signal filtering and signal windowing are applied. In step 13, the feature set dimension is reduced. This may be implemented by analyzing correlation of features with each other and by discarding a feature set that is (strongly) dependent upon a feature already included in a damage-reflecting feature set.

In step 14, uncertainty in sensor measurements is managed by using kernels functions to transfer data into a feature(s)-to-damage meta-domain. The kernels may be probabilistic, fuzzy logic, deterministic, etc. In step 15, a feature(s)-to-damage mapping or association is created. The feature(s)-to-damage mapping or association may be implemented using a RVM approach to identify relevance vectors in a transformed feature-damage domain along with their weights. The feature(s)-to-damage mapping or association may also be implemented using a GPR approach in which covariance functions are selected and their parameters are identified. The feature(s)-to-damage mapping or association may also be implemented using a PF approach, in which a model for feature(s)-to-damage correlation is selected, and model parameters along with damage estimates treated as state variables to be tracked; tracking plus feedback is used to fine tune the model parameter values. The feature(s)-to-damage mapping or association may also be implemented using a NN or other data-driven approaches.

In step 16, uncertainty bounds on the damage estimate are quantified. The variation of damage may be estimated by the probabilistic algorithms used for the feature(s)-to-damage mapping. Alternatively, an application-dependent analysis of initial damage is performed. Alternatively, a random variation is performed around a present damage estimate, using Bayesian analysis and updates to quantify and manage the damage uncertainty.

In step 17, uncertainties in future operating conditions, to the extent that future operating conditions are not determined by the preceding operating conditions, are estimated. User-defined uncertainty bounds, centered on expected future usage, may be introduced. A set of alternate operating scenarios may be used to introduce uncertainty. Variation of past usage may be correlated with expected future usage to support estimates of future usage.

In step 18, a mapping or association of operating conditions to damage growth rate is created. The mapping or association of operating conditions to damage growth rate in step 15 may also be implemented using RVM, GPR, PF and/or NN (or other data-driven) approaches. In step 19, the feature(s)-to-damage map and the operating-conditions-to-damage-growth-rate map are provided as outputs of the training mode.

Figure 2:
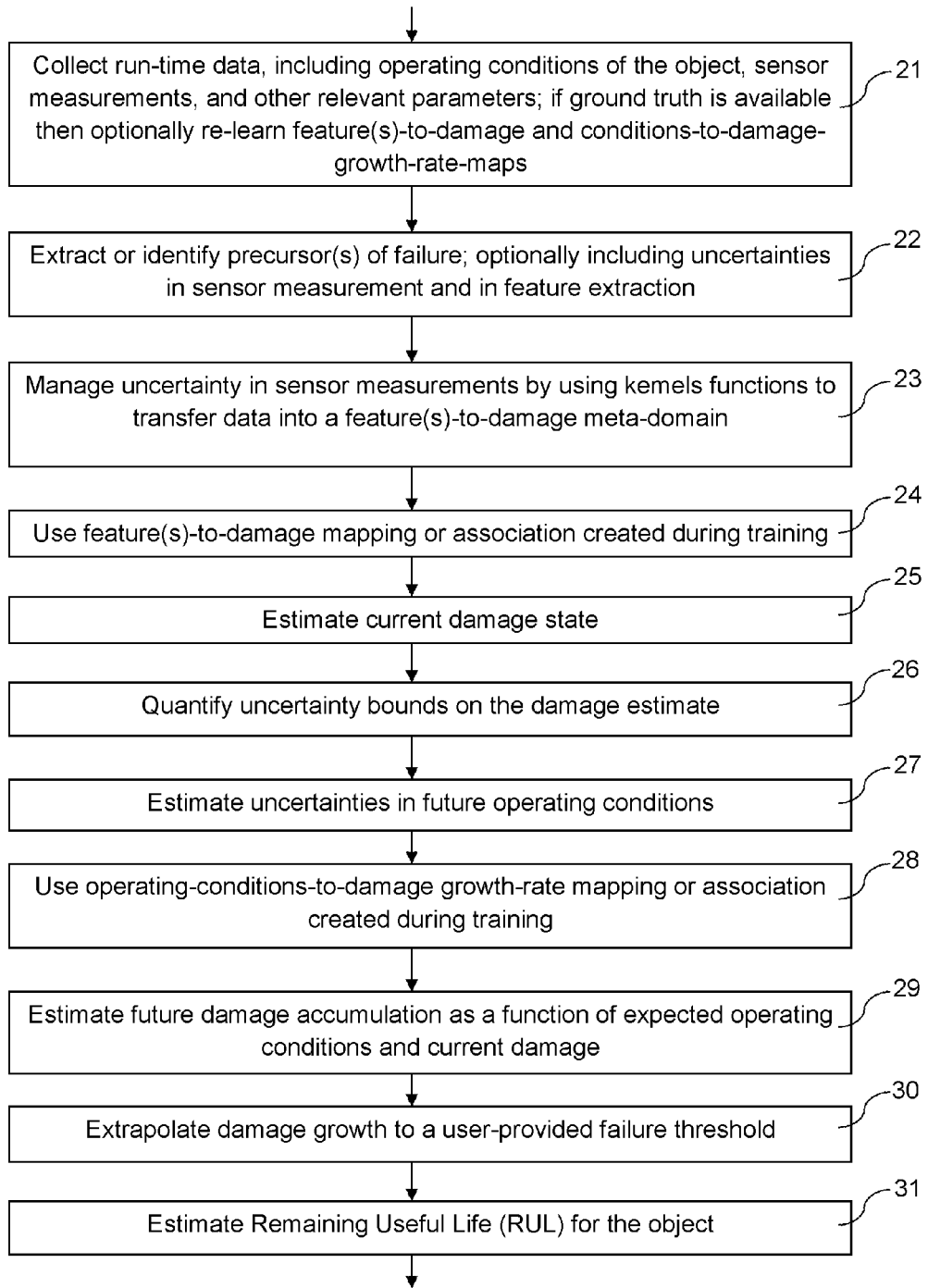

FIG. 2 is a flow chart of procedural steps used to practice the run-time (on-line) mode of the invention. In step 21, the system collects run-time data, including present operating conditions of the object, sensor measurements, and other relevant parameters. If ground truth is available then the feature(s)-to-damage and conditions-to-damage-growth-rate maps may be optionally re-learnt. In step 22, the system extracts or identifies precursors of failure and the associated features. Optionally each feature extracted is associated with an uncertainty in sensor measurement and in feature extraction. Optionally, clean-up processes such as de-noising, signal filtering and signal windowing are applied.

In step 23, sensor data is transformed into the feature(s)-to-damage meta-domain by using kernels, in order to manage uncertainty. In step 24, the feature(s)-to-damage mapping or association is used. In step 25, a present damage state is estimated.

In step 26, uncertainty bounds on the current damage estimate are quantified. In step 27, uncertainties in future operating conditions are estimated. In step 28, the mapping of operating conditions to damage growth rates is used. In step 29, future damage accumulation (e.g., damage growth rate) is estimated. In step 30, the estimated damage growth is extrapolated to a user-provided failure threshold. This is achieved by adding estimated future damage accumulation to (estimated) present damage over a corresponding time interval to arrive at an updated damage value. This process is terminated when the failure threshold is reached or exceeded. In step 31, an estimated RUL for the object is computed, measured from current run-time (e.g., initiation of RUL prediction routine).

What is claimed is:

1. A program storage device embodying a program of instructions contained on non-transitory, computer readable media, executable by the computer to explicitly decompose uncertainties associated with a remaining useful life (RUL) of a worn or otherwise damaged active object, wherein the uncertainties comprise:

(i) a first uncertainty in at least one-failure precursor-feature-to-damage mapping, where the first uncertainty is numerically computed and represented as a first uncertainty distribution;

(ii) a second uncertainty in a user-defined future usage of the object, where the second uncertainty is numerically computed and represented as a second uncertainty distribution;

(iii) a third uncertainty in at least one estimated future damage growth rate, where the third uncertainty is numerically represented as a third uncertainty distribution; and (iv) wherein the uncertainties (i), (ii) and (iii) are implemented using an uncertainty management program that numerically combines the computed first, second and third uncertainties to further compute and present to a user a remaining useful life (RUL) uncertainty for a future time, of a worn or otherwise damaged active object, as an output of a kernel function that computes a RUL, by quantifying how much time is left until functionality of the object is lost.

2. The program storage device of claim 1, wherein said uncertainty management program incorporates a Relevance Vector Machine and at least one of a Particle Filter and a Gaussian Process Regression.

3. The program storage device of claim 1, wherein said uncertainties in said RUL of said active object further comprise at least one of:

(v) a fourth uncertainty in at least one sensor value measurement, where the fourth uncertainty is numerically computed and represented as a fourth uncertainty distribution;

(vi) a fifth uncertainty in at least one failure-precursor-feature of damage to said object where the fifth uncertainty is numerically computed and represented as a fifth uncertainty distribution;

(vii) a sixth uncertainty in at least one estimated future operating condition, where the sixth uncertainty is numerically computed and represented as a sixth uncertainty distribution;

(viii) a seventh uncertainty in at least one estimated future sensor value, where the seventh uncertainty is numerically represented as a seventh uncertainty distribution; and (ix) at least one correlation between a past usage of the object and at least one uncertainty in said user-defined future usage of said object, where the correlation is numerically computed and represented as an eighth uncertainty distribution;

(x) wherein at least one of the fourth, fifth, sixth, seventh and eighth uncertainties is implemented using an uncertainty management program and is numerically combined with said computed first, second and third uncertainties to further compute and present to a user said remaining useful life (RUL) uncertainty for a future time, of said worn or otherwise damaged active object, as an output of a kernel function that computes a RUL, by quantifying how much time is left until functionality of the object is lost.

4. The program storage device of claim 3, wherein said uncertainty management program incorporates a Relevance Vector Machine and at least one of a Particle Filter and a Gaussian Process Regression.

5. A program storage device embodying a program of instructions contained on non-transitory, computer readable media, executable by a computer to predict or estimate remaining useful life (RUL) of a worn or otherwise damaged active object from at least one characteristic of damage to the object, the instructions comprising:

(i) functional decomposition of a damage progression learning task, for a worn or otherwise damaged active object, into at least two independent parts comprising current damage estimation and damage growth rate estimation;

(ii) measurement and collection of training data, comprising sensor measurements, operating conditions, and at least one ground truth damage attribute;
(iii) identification of at least one precursor of failure feature of the object;
(iv) provision of a first mapping of failure-precursor-feature-to-damage that associates a precursor of failure feature of the object with current damage to the object;
(v) provision of a second mapping that associates at least one operating condition for the object with growth rate of damage to the object;
(vi) measurement and collection of run-time data from the object, including at least one present operating condition and at least one estimated future operating condition for the object, relation of each of at least one of the failure precursor features to current damage to the object using the first mapping and at least one ground truth damage attribute for the object;
(vii) identification of at least one failure precursor feature of the object from the run time data;
(viii) use of the first mapping to estimate the current damage for the object;
(ix) use of the second mapping of the at least one operating condition with the growth rate of damage to the object to estimate a future damage growth rate from at least one future operating condition;
(x) provision of a selected failure threshold and extrapolation of the damage growth rate to a failure threshold; and
(xi) computation and presentation of a remaining useful life (RUL) for the object, measured as a difference between estimated time when the failure threshold will be reached and a present time;
(xii) provision of a first uncertainty in said at least one failure-precursor-feature-to-damage mapping, where the first uncertainty is numerically computed and represented as a first uncertainty distribution;
(xiii) provision of a second uncertainty in a user-defined future usage of said object, where the second uncertainty is numerically computed and represented as a second uncertainty distribution;
(xiv) provision of a third uncertainty in said at least one estimated future damage growth rate, where the third uncertainty is numerically represented as a third uncertainty distribution; and
(xv) implementation of the uncertainties (xii), (xiii) and (xiv) using an uncertainty management program that numerically combines the computed first, second and third uncertainties to further compute and present to a user a remaining useful life (RUL) uncertainty for a future time, of said worn or otherwise damaged active object, as an output of a kernel function that computes a RUL, by quantifying how much time is left until functionality of the object is lost.

6. The program storage device of claim 5, wherein said estimated future damage growth rate is correlated with at least one damage growth mapping, chosen to correspond to changes in said at least one ground truth damage attribute.

7. The program storage device of claim 6, wherein said estimated future damage growth mapping is represented as a nonlinear damage growth model, with at least one nonlinear growth model parameter chosen to correspond to said at least one ground truth damage attribute.

8. The program storage device of claim 5, wherein a number of identified failure precursor features in a set is reduced by discarding at least one of said failure precursor features that (i) is already included in the identified set of failure precursor features that are associated with said damage to said object and (ii) is correlated with at least one other failure precursor feature in the identified failure precursor feature set with a correlation value that is at least equal to a threshold correlation value.

9. The program storage device of claim 5, wherein said ground truth damage attribute for said current damage is obtained through direct observation of said object.

10. The program storage device of claim 5, wherein said ground truth attribute for said current damage is obtained from an observation that is not a direct measure of said current damage of said object.

11. The program storage device of claim 5, wherein said ground truth attribute for said current damage is obtained from collected training data where said object is operated and training data are collected until said current damage exceeds said failure threshold.

12. The program storage device of claim 5, wherein said uncertainty management program incorporates a Relevance Vector Machine and at least one of a Particle Filter and a Gaussian Process Regression.

13. A program storage system embodying a program of instructions contained on non-transitory, computer readable media, executable by the computer, for predicting or estimating remaining useful life (RUL) of a worn or otherwise damaged active object from at least one characteristic of damage to the object, the system comprising:
(i) a problem formulation component that functionally decomposes the damage progression learning task into at least two independent parts comprising (i) accumulated damage estimation, and (ii) damage growth rate estimation;
(ii) a data measurement and collection component that measures and collects training data, comprising sensor measurements, object operating conditions, and at least one ground truth damage attribute;
(iii) a failure precursor feature extraction component that identifies at least one precursor of failure feature of the object;
(iv) a first data analysis component that provides a first mapping that associates a failure precursor feature of the object with accumulated damage to the object;
(v) a second data analysis component that creates a second mapping that associates at least one operating condition for the object with growth rate of damage to the object;
(vi) a run time data collection component that measures and collects run time data from the object, including at least one present operating condition and at least one computed future operating condition for the object, relation of each of at least one of the failure precursor features to damage to the object, and at least one ground truth damage attribute for the object;
(vii) a failure precursor feature extraction component that identifies at least one failure precursor features for the object from the run time data;
(viii) a damage estimation component that uses the first mapping to estimate current damage to the object;
(ix) a damage prediction component that: (a) uses the second mapping of operating conditions with object damage growth rate to estimate a future damage growth rate from at least one future operating condition; (b) provides a failure threshold and extrapolates the computed damage growth rate to the failure threshold; and (c) computes and presents a remaining useful life (RUL) for the worn or otherwise damaged active object, measured as a difference between estimated time when the failure threshold will be reached and a present time: and (x) an uncertainty management component that numerically computes uncertainties in (a) a failure-precursor-feature-to-damage mapping for the object, (b) a user-defined future usage of the object, and (c) a future damage growth rate, and combines computed uncertainties in (a), (b) and (c) to further compute and present to a user a remaining useful life (RUL) uncertainty for a future time, of the worn or otherwise damaged active object, as an output of a kernel function, by quantifying how much time is left until functionality of the object is lost.

14. The system of claim 13, wherein said damage growth is further represented with at least one damage growth mapping, chosen to correspond to said at least one ground truth damage attribute.

15. The system of claim 14, wherein said damage growth mapping is further represented as a nonlinear damage growth model, with at least one nonlinear growth model parameter chosen to correspond to said at least one ground truth damage attribute.

16. The system of claim 13, wherein an identified failure precursor feature set is reduced in size by discarding at least one of said failure precursor features that (i) is already included in said identified set of failure precursor features that are associated with said damage to said object and (ii) is correlated to at least one other failure precursor feature in the identified failure precursor feature set with a correlation value at least equal to a selected threshold correlation value.

17. The system of claim 13, wherein said ground truth attribute is obtained for said current damage through direct observation.

18. The system of claim 13, wherein said ground truth attribute is obtained for said current damage by derivation from an observation that is not a direct measure of said current damage condition.

19. The system of claim 13, wherein said ground truth attribute is obtained for said current damage from collected training data where said object is operated and training data are collected until said damage exceeds said failure threshold.

20. The system of claim 13, wherein said uncertainty management component incorporates a Relevance vector Machine and at least one of a Particle Filter and a Gaussian Process Regression.

21. The system of claim 13, wherein-said uncertainty management component further numerically computes an uncertainty in at least one of: (d) present sensor value measurements, (e) said failure precursor feature computations, (f) future operating conditions, (g) correlation between a past usage of said object and said future usage of the said object, and (h) a future sensor value measurement, and combines computed uncertainties, in addition to said uncertainties in (a), (b) and (c) in claim 13, to further compute and present to a user said remaining useful life (RUL) uncertainty for a future time, of said worn or otherwise damaged active object, as an output of a kernel function that computes a RUL, by quantifying how much time is left until functionality of said object is lost.

22. The system of claim 21, wherein said uncertainty management component incorporates a Relevance Vector Machine and at least one of a Particle Filter and a Gaussian Process Regression.

* * * * *